May 11, 1954
W. M. MADSEN
2,678,110
CYCLONE SEPARATOR
Filed Feb. 12, 1951
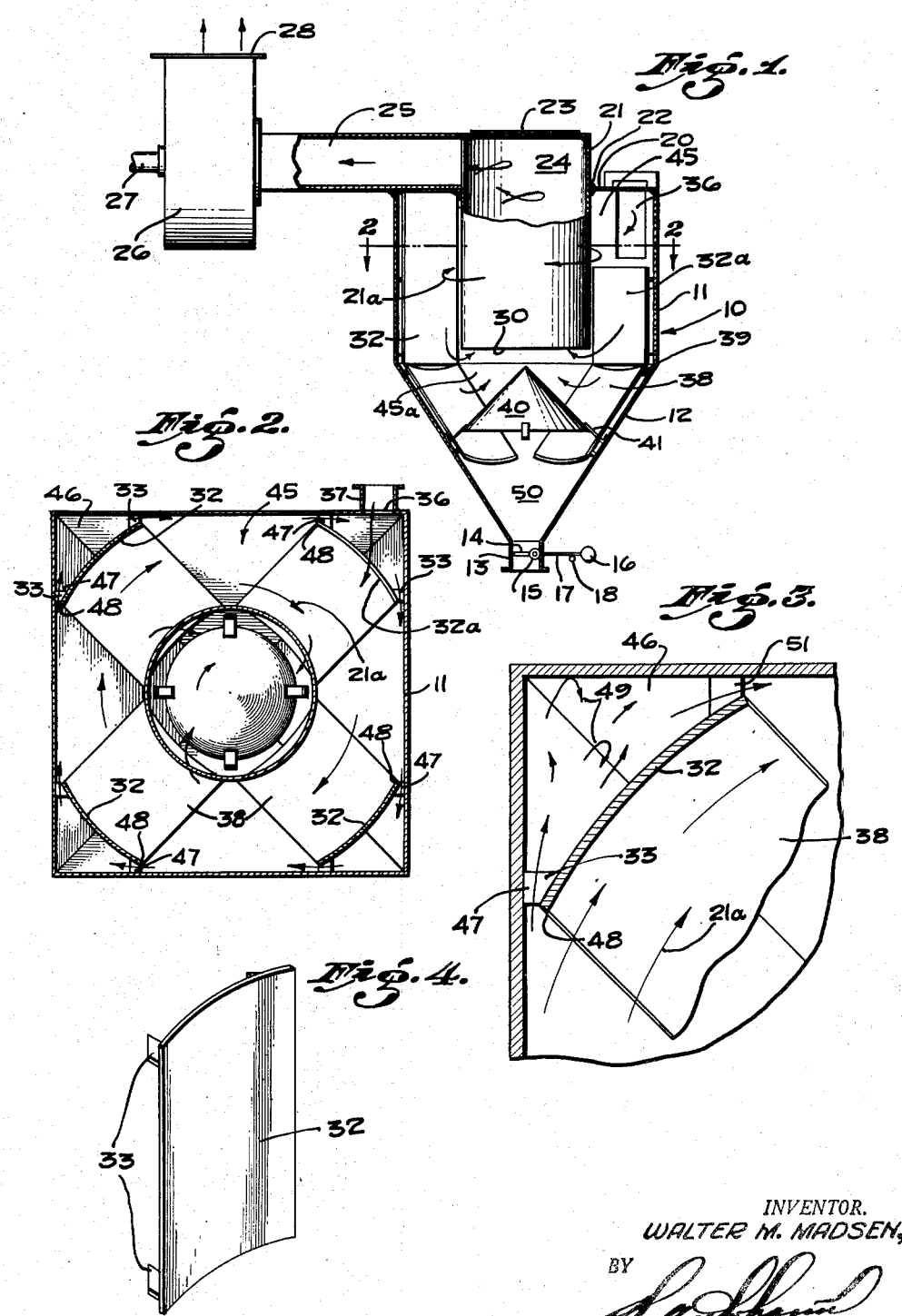
INVENTOR.
WALTER M. MADSEN,
BY
ATTORNEY Patented May 11, 1954

2,678,110

UNITED STATES PATENT OFFICE 2,678,110

CYCLONE SEPARATOR

Walter M. Madsen, Alhambra, Calif.

Application February 12, 1951, Serial No. 210,455

5 Claims. (Cl. 183—85)

This invention relates to separators generally and relates more particularly to the cyclone type of separator.

In road building, an aggregate of rocks is used and it is common to use an aggregate comprising amounts of crushed rock which is run through a dryer, usually of the direct-fired counter-flow type. The dryer interior is equipped with channel lifters and as the dryer shell turns, the lifters raise the material and cascade it through the flaming hot gases. This curtain of material, occurring many times per minute, is subjected to intense heat and draft which results in the pouring out of huge volumes of dust from the dryer stack.

The collection of dust discharged from the dryer in the production of asphalt and rock and sand mixes is important. For one thing, the amount of dust in the aggregate may amount to as much as 5% with production running in the neighborhood of 100 T. P. H. The dust, if lost into the atmosphere, would amount to a loss of approximately 5 T. P. H. at such a production rate. As the dust may be used in the mix, it is of considerable commercial value and well worth recovering. Moreover, in crowded areas where plants of this character frequently operate, dust discharged into the atmosphere creates a nuisance.

The dust may be collected by wet methods but this requires a great amount of water which may involve various well-known difficulties. Hence, the present dry method of dust separation is a very important one inasmuch as the more dust that can be collected by this method, the less need be collected through the wet method.

The present device has been found to collect from 80 to 85 percent of the dust discharged from the dryer stack which will amount to 4 T. P. H. or more where the production is running in the neighborhood of 100 T. P. H. as above described. Consequently, the wet method need be used to collect only a small percentage of the dust discharged from the dryer stack, in the neighborhood of 15 to 20 percent thereof.

While the present invention is particularly useful in the foregoing connection, its utility is of wider scope and hence is not limited thereto.

It is an object of the present invention to provide an improved separator, of the present type, for separating solid particles from a fluid, particularly separating dust from air.

Another object of the invention is to provide a device of this character having a body which is square in cross-section and which has interior baffles across the corners for defining precipitation pockets at said corners and skimming off into said pockets a peripheral portion of air whirling within the body.

It is still another object of the invention to provide apparatus of this character wherein the dust-laden air skimmed into the precipitation pockets is slowed down and a turbulence created therein to thereby effect precipitation by gravity of the dust particles entrained in said air.

It is a further object of the invention to provide apparatus of this character that is effective in its operation.

It is still a further object of the invention to provide apparatus of this character that is simple in construction.

Another object of the invention is to provide apparatus of this character that is relatively inexpensive to manufacture.

Heretofore, it has generally been the practice to provide cyclonic separators of very large size. In fact the separators of this character have usually been so large as to be too wide for transportation over highways. In order to overcome this difficulty, the present invention is of such character that several small units, which are square in cross-section, may be mounted on a vehicle for transporting same and provide a highly efficient apparatus for separating and recovering dust.

It has also been found that units having the hollow body, square in cross-section, are easier to repair than those cylindrical in cross-section. When the device is in operation, the heavier particles are thrown outwardly by centrifugal force so that the walls of the body of the unit are subjected to considerable abrasive action which will eventually wear through the walls. When it is found that a part is about to wear through, a flat plate may be welded on the outside and thus the repair job can be effected before there is a breakdown. Consequently the apparatus may be very easily repaired better in the field which is a great advantage.

Further objects and advantages of the invention will be brought out in the following part of the specification.

Referring to the drawings which are for illustrative purposes only:

Fig. 1 is a partial diagrammatic view showing a separator embodying the present invention;

Fig. 2 is a section taken on line 2—2 of Fig. 1;

Fig. 3 is an enlarged fragmentary view of a corner portion of the device or apparatus; and Fig. 4 is an enlarged isometric view of one of the baffles.

Referring more particularly to the drawings, the device comprises a hollow body, indicated generally at 10, including an upper section 11 and which is square in cross-section, and a lower inverted frusto-pyramidal section 12, the latter having a tubular discharge end portion 13 and a valve 14 controlling the discharge passage in said end portion. The valve 14 is pivoted at 15 and is urged in the closing direction by a weight 16 adjacent the free end of a lever 17 connected to said valve 14. The valve is limited in its closing movement by a stop 18 and is adapted to open automatically when the weight of material on the upper side of said valve 14 is greater than that of the weight 16.

The upper body section 11 is provided with a top 20 which may be secured to the section 11 by any suitable means such as welding, said top 20 having a central opening in which is received a cylindrical stack 21 secured to the top 20 by welding or other suitable means indicated at 22. The stack 21 is open at the lower end and closed at the upper end by an end member 23, an upper end portion of said stack extending above the top 20. The stack defines an outlet chamber 24 connected by means of an outlet conduit 25 with an inlet of an air moving device such as a pump or suction device 26 driven by any suitable means through a shaft 27, said device 26 having an outlet 28.

The stack is of smaller size than the body section 11 and is axially arranged therein so that said stack is spaced a substantial distance from each of the side walls of said body section and it is to be noted that the lower end 30 of the stack is spaced upwardly somewhat from the plane of the lower end of the body section 11.

At each corner of the body section 11 is an internal baffle which is arcuate in cross-section and which extends longitudinally of the section 11, certain of said baffles, indicated at 32, extend substantially the full length of the section 11 and one of said baffles, indicated at 32a, is shorter than section 11 as will be hereinafter described.

The baffles are connected to the side walls of the upper body section 11 by means of brackets 33, said brackets being secured to the respective parts by welding or other suitable means. The side edges of the baffles 32 are spaced from the respective adjacent walls of the body section 11. As pointed out above the baffle 32a is shorter than the rest and extends from the plane of the lower end of the body section 11 upwardly to a point adjacent an inlet opening 36 located at one corner of the body section 11, said inlet opening 36 being adjacent the upper end of said body portion. An inlet conduit 37 is connected to the body by any suitable means and registers with the opening 36.

The lower body section 12 is also provided with internal corner baffles, indicated at 38, and said baffles are suitably connected to the lower body section 12 by brackets 39 which are welded to the respective parts or otherwise suitably connected thereto. The baffles 38 also have their side edges spaced from the adjacent respective walls of the section 12 and said baffles 38 extend downwardly and at an inclined angle from the plane of the junction between the body sections 11 and 12.

Disposed in spaced relation to the lower end of the stack 21 is a cone shaped member 40 which is axially aligned with said stack 21. The member 40 is secured to the adjacent walls of the lower body section 12 by brackets 41 which are welded or otherwise suitably secured to the respective parts. The cone 40 is of approximately the same diameter at its lower end as the stack 21, the lower end of said cone being disposed upwardly of the lower ends of the baffles 38. The apex of the cone is substantially at the plane of the junction of the upper and lower body sections 11 and 12.

In operation, the suction device 26 causes a circulation of dust-laden air through the apparatus. This dust-laden air enters at 36, substantially tangentially of the body section 11 and particularly the part defined by the baffles 32, 32a and the intermediate wall portions of the body section 11. The annular space, indicated generally at 45, may be termed the cyclone chamber, said chamber being interiorly defined by the stack 21 and exteriorly by the baffles 32, 32a and the intermediate wall portions of the section 11. Space 45a in the lower body section 12 is also a part of the cyclone chamber. The air swirls about the stack 21, as shown by arrows 21a, and enters said stack from the lower end, being deflected upwardly by the cone 40. The air within the stack also has a tendency to swirl and leaves said stack at the upper end thereof by means of the conduit 25 from which it enters the suction device 26 and is discharged therefrom at 28.

Dust particles carried by the air are thrown outwardly in the chamber 45 by centrifugal force. The peripheral part of the body or mass of air in the chamber 45 contains the heavier particles which are thrown outwardly by centrifugal force and this peripheral part or layer of said body or mass of air with its construction of dust particles is skimmed off by the baffles 32 and 32a, the skimmed-off portion of the dust-laden air entering the corner chambers or pockets 46, which may be termed dust-collection chambers or precipitation pockets, through the spaces 47 between the leading edges 48 of the baffles 32 and 32a and the adjacent walls of the body section 11. The peripheral layer of dust-laden air entering the enlarged pockets 46 slows down by reason of the enlarged space of the pockets 46 so that the dust particles entrained in said air will drop by gravity into the lower part of the body. Also such air strikes the body walls opposite the openings 47 and, as a result, the air is additionally slowed down in its movement and a turbulence thereof is set up as indicated by the arrows 49. As a result the dust drops by gravity and accumulates in the lower end 50 of the body portion 12 until there is a sufficient weight of dust to cause the valve 14 to open as hereinabove described.

Dust-laden air which is swirled in the lower section 12 of the body 10, particularly with the space between the lower end of the stack 21 and the cone 40, is skimmed off by the baffles 38 in a manner similar to that described in connection with the baffles 32 and 32a.

It has been found that the above described apparatus is effective in recovering dust from air and it appears that besides the slowing down of the air current in the pockets 46 and the turbulence of said air in said pockets, a drop in pressure in said pockets 46 contributes to the precipitation of the dust therein. The air from which the dust has precipitated leaves the pockets 46 by way of the spaces 51 opposite the spaces 47, and returns to the main body of air in the chamber 45.

The apparatus of the present invention, which includes the square type of body has been found to cost less to manufacture than circular types of cyclone recovery devices and it has also been found that repairing the units of this type costs less than in the case of circular types. Repairing the units in the field with flat sections, rather than circular sections, has also been found to be easier and cheaper.

I claim:

1. In apparatus of the class described: a hollow body comprising upper and lower sections, the upper section being square in cross section and the lower section being frusto-pyramidal in shape with the base secured to the lower end of the upper section, the smaller depending end having a material discharge opening, said upper section having an inlet opening adjacent one corner; an automatically openable valve adjacent the discharge opening for controlling the discharge of material therefrom; a top on said body, said top having a central opening therein; a tubular stack in said opening, said stack having portions extending downwardly into the upper body section and upwardly of the top, the outer end of the stack having an outlet opening adapted to be connected with an air moving device; a cone shaped member below the lower open end of the stack and located in spaced relation thereto, said cone shaped member being axially aligned with the stack; and a baffle adjacent each corner of the body sections, said baffles extending longitudinally of the respective sections and being arcuate in cross section, the longitudinal edges of said baffles being spaced from the respective adjacent walls of the body sections, said baffles defining precipitation pockets with the adjacent wall portions of the body sections and defining with the intermediate portions of said walls and with the stack an annular cyclone chamber into which air is generally tangentially received.

2. In apparatus of the class described: a hollow body comprising upper and lower sections, the upper section being square in cross section and the lower section being frusto-pyramidal in shape with the base secured to the lower end of the upper section, the smaller depending end having a material discharge opening, said upper section having an inlet opening adjacent one corner; a top on said body, said top having a central opening therein; a tubular stack in said opening, said stack having portions extending downwardly into the upper body section and upwardly of the top, the outer end of the stack having an outlet opening adapted to be connected with an air moving device; a cone shaped member below the lower open end of the stack and located in spaced relation thereto, said cone shaped member being axially aligned with the stack; and a baffle adjacent each corner of the body sections, said baffles extending longitudinally of the respective sections and being arcuate in cross section, the longitudinal edges of said baffles being spaced from the respective adjacent walls of the body sections, said baffles defining precipitation pockets with the adjacent wall portions of the body sections and defining with the intermediate portions of said walls and with the stack an annular cyclone chamber into which air is generally tangentially received.

3. In apparatus of the class described: a hollow body comprising upper and lower sections, the upper section being square in cross section and having an inlet opening adjacent one corner and the lower section also being square and being tapered toward the lower end with the base secured to the lower end of the upper section, the smaller depending end having a material discharge opening; an automatically openable valve adjacent the discharge opening for controlling the discharge of material therefrom; a top on said body, said top having a central opening therein; a tubular stack in said opening, said stack having portions extending downwardly into the upper body section and upwardly of the top, the outer end of the stack having an outlet opening adapted to be connected with an air moving device; a cone shaped member below the lower open end of the stack and located in spaced relation thereto, said cone shaped member being axially aligned with the stack; and a baffle adjacent each corner of the body sections, said baffles extending longitudinally of the respective sections and being arcuate in cross section, the longitudinal edges of said baffles being spaced from the respective adjacent walls of the body sections, said baffles defining precipitation pockets with the adjacent wall portions of the body sections and defining with the intermediate portions of said walls and with the stack an annular cyclone chamber into which air is generally tangentially received.

4. In apparatus of the class described: a hollow body comprising upper and lower sections, the upper section being square in cross section and the lower section being frusto-pyramidal in shape with the base secured to the lower end of the upper section, the smaller depending end having a material discharge opening, said upper section having an inlet opening adjacent one corner; a top on said body, said top having a central opening therein; a tubular stack in said opening, said stack having portions extending downwardly into the upper body section and upwardly of the top, the outer end of the stack having an outlet opening adapted to be connected with an air moving device; and a baffle adjacent each corner of the body sections, said baffles extending longitudinally of the respective sections and being arcuate in cross section, the longitudinal edges of said baffles being spaced from the respective adjacent walls of the body sections, said baffles defining precipitation pockets with the adjacent wall portions of the body sections and defining with the intermediate portions of said walls and with the stack an annular cyclone chamber into which air is generally tangentially received.

5. In apparatus of the class described: a hollow body comprising upper and lower sections, the upper section being square in cross section and the lower section being frusto-pyramidal in shape with the base secured to the lower end of the upper section, the smaller depending end having a material discharge opening; and a baffle adjacent each corner of the body sections, said baffles extending longitudinally of the respective sections and being arcuate in cross section, the longitudinal edges of said baffles being spaced from the respective adjacent walls of the body sections, said baffles defining precipitation pockets with the adjacent wall portions of the body sections and defining with the intermediate portions of said walls an annular cyclone chamber, said upper section having an inlet opening communicating tangentially with said cyclone chamber.

References Cited in the file of this patent

UNITED STATES PATENTS

| Number | Name | Date |
| --- | --- | --- |
| 389,786 | Allington et al. | Sept. 18, 1888 |
| 853,517 | Osborne | May 14, 1907 |
| 1,029,214 | Morse | June 11, 1912 |
| 1,276,016 | Bennett | Aug. 20, 1918 |
| 1,536,592 | Klug | May 5, 1925 |
| 1,721,908 | Heist | July 23, 1929 |
| 2,155,911 | Shaw | Apr. 25, 1939 |
| 2,331,786 | Lincoln | Oct. 12, 1943 |